Aug. 12, 1930.  H. C. MAISE  1,772,779
VEHICLE BODY AND TOP CONSTRUCTION
Filed Oct. 22, 1928    3 Sheets-Sheet 2
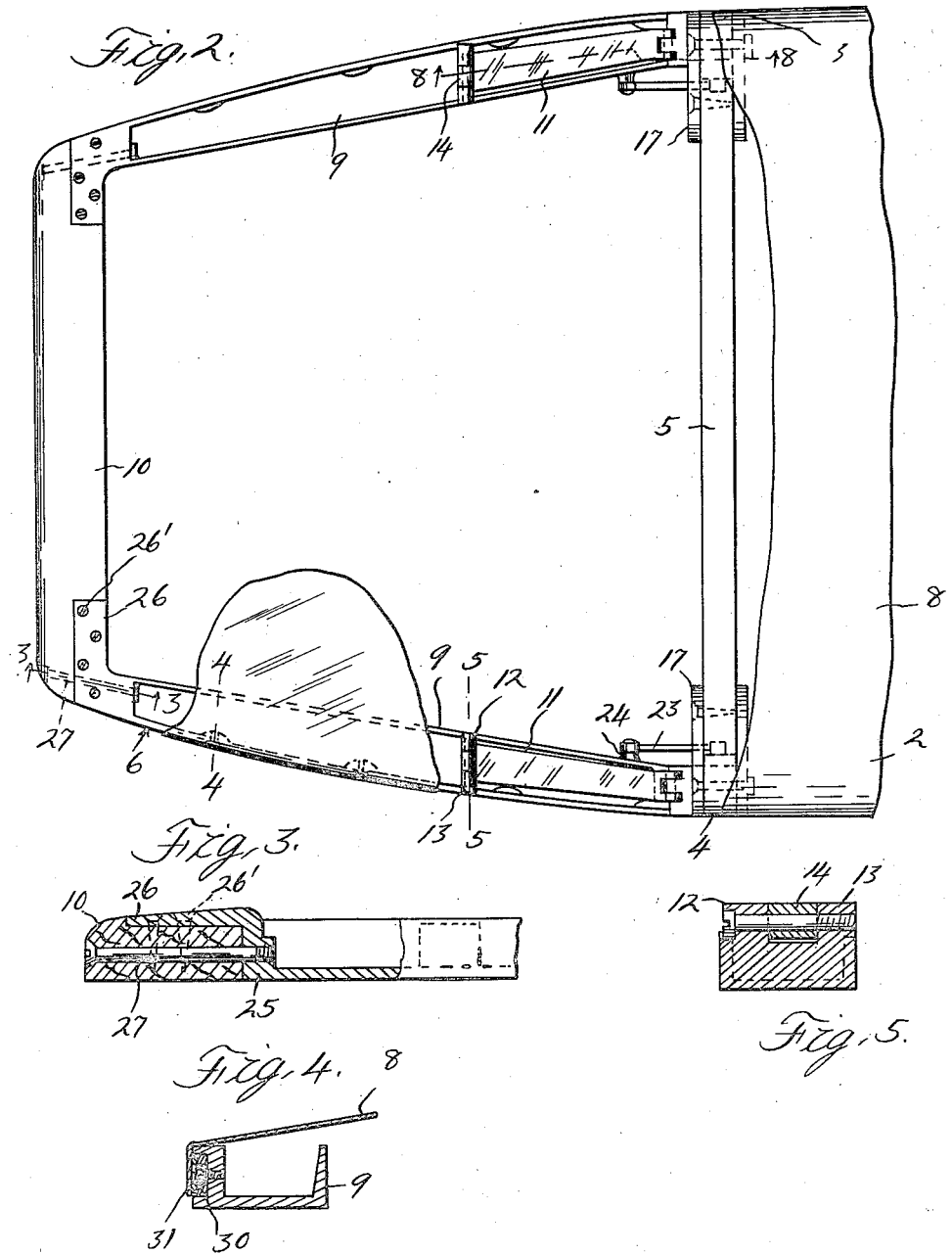
Inventor
Herman C. Maise
By Whittemore Hulbert
Whittemore & Belknap
Attorneys

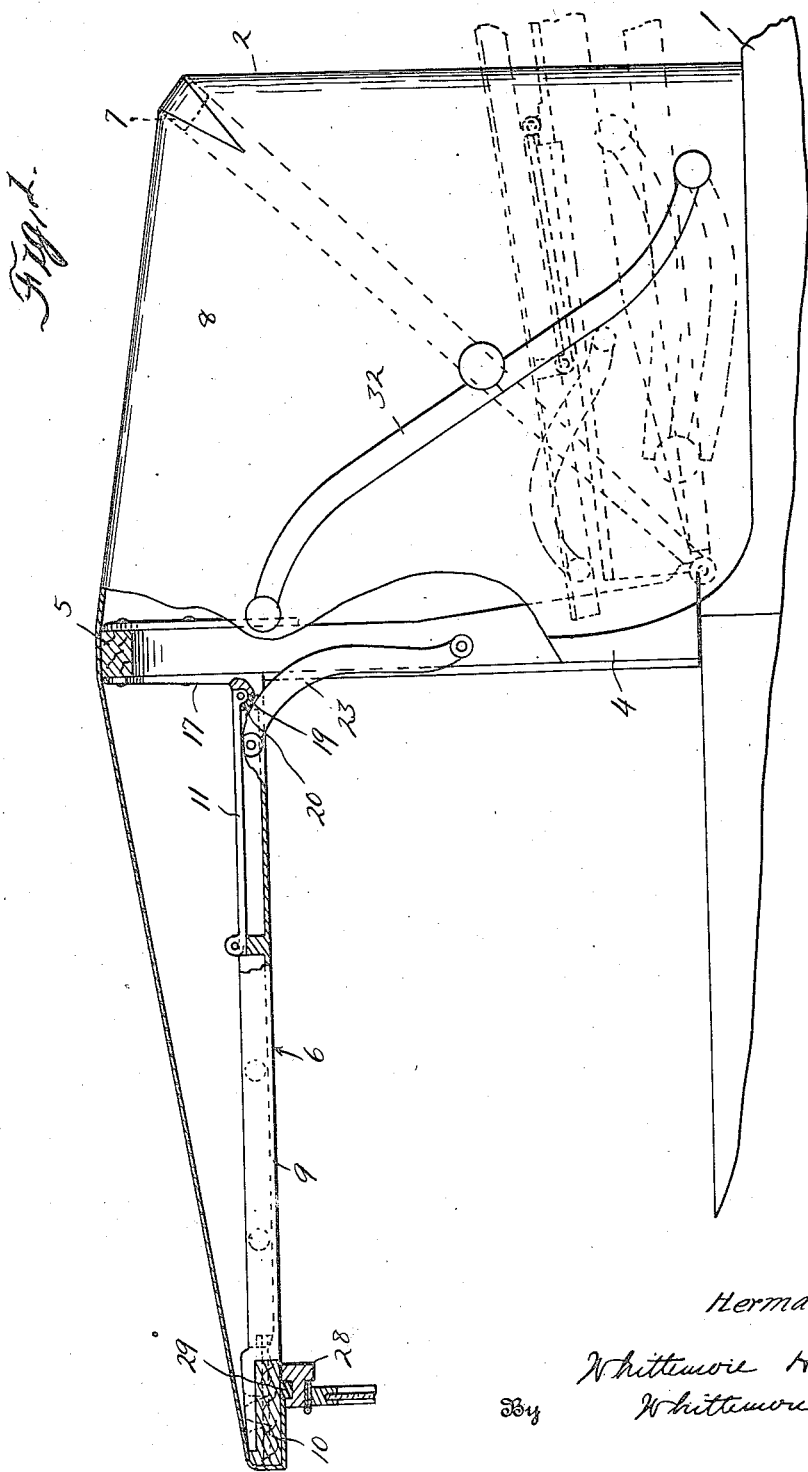

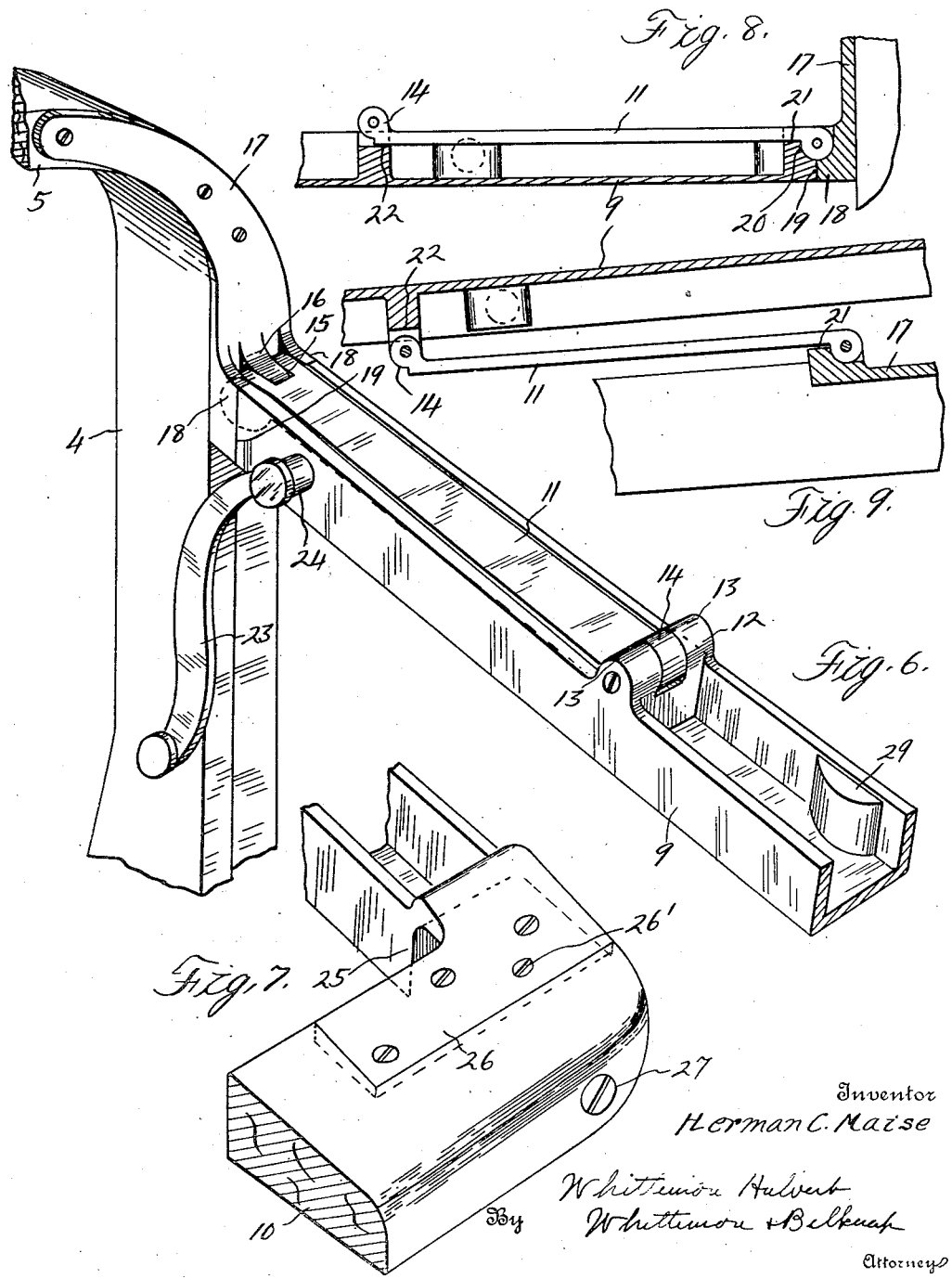

Patented Aug. 12, 1930

1,772,779

UNITED STATES PATENT OFFICE

HERMAN C. MAISE, OF DETROIT, MICHIGAN, ASSIGNOR TO BRIGGS MANUFACTURING COMPANY, OF DETROIT, MICHIGAN, A CORPORATION OF MICHIGAN

VEHICLE BODY AND TOP CONSTRUCTION

Application filed October 22, 1928. Serial No. 314,211.

This invention relates to vehicle body constructions of the closed car type in which the upper body and top are capable of being collapsed to permit the vehicle to assume the appearance of an open car and to allow the occupants to obtain all the advantages thereof.

An object of the invention is to provide a construction in which the body and top may be easily and quickly moved from one position to another. Another object is to provide an upper body and top frame construction which when in its uncollapsed position, will be rigid and possess all of the advantages of a permanent body and top construction.

With the above and other objects in view, the invention consists in certain novel features of construction, combinations and arrangements of parts as will be more fully described and particularly pointed out in the appended claim.

In the accompanying drawings:

Figure 1 is a side elevation of my invention partly in section with portions of the fabric covering broken away, the frame being shown in full lines in uncollapsed position and in dotted lines in collapsed position;

Figure 2 is a top plan view thereof with portions of the fabric broken away;

Figures 3, 4 and 5 are sections through lines 3—3, 4—4 and 5—5 respectively of Figure 2;

Figure 6 is an enlarged detail perspective view of the connection between a pillar and one of the side bars;

Figure 7 is a detail showing the connection between the header and the front end of one of the side bars;

Figures 8 and 9 are fragmentary views showing a side bar and pillar in uncollapsed and collapsed positions respectively.

Referring now to the drawings the numeral 1 designates the usual rigid lower body construction of a motor vehicle, while 2 designates the top and upper portions of the body which are capable of being collapsed from the full line position shown in Figure 1 to the dotted line position shown in said figure. This upper collapsible portion includes a framework comprising a pair of central pillars 3 and 4 respectively which are hingedly secured at their lower ends to the lower body portion 1 and which are connected by means of a cross bar 5. These pillars and cross bar are preferably formed of wood and in the present instance are integrally connected together to form a substantially U-shaped frame member. Supported upon said pillars and projecting forwardly therefrom, is a forward frame member 6 while a rearwardly extending bow 7 is hinged to the lower body portion at the same point where the pillars are hinged thereto.

Suitably stretched over the framework and secured thereto, is a fabric covering 8 which is capable of being folded when the frame member 2 is collapsed to the dotted line position shown in Figure 1.

The forward frame member 6 is made up of metallic side bars 9 and a header 10 extending between the side bars and connecting the front ends thereof. Each side bar 9 is preferably channel-shape in cross section with the channel opening upwardly. These side bars are connected to the pillars by means of links 11, each side bar being provided with an integral hinge section 12 having spaced ears 13 between which is adapted to extend, a hinge section 14 projecting from one end of the link 11.

The opposite end of each link 11 is provided with rounded portions 15 constituting a hinge section adapted to embrace a hinge section 16 projecting from a metal plate 17 suitably secured to the upper portion of one of the pillars 4. Spaced upon each side of the hinge section 16 and forming therewith openings for receiving the portions 15 of the hinge section of the link, are shoulders 18, each having a straight face portion lying parallel to the forward face of the pillar and adapted in the uncollapsed position of the frame, to abut against and constitute a bearing surface for the inner end 19 of its respective side bar. As shown in Figure 8, the end portion 19 encloses the channel and is provided with curved recesses 20 adapted to engage the lower faces of the hinge portions 15 and to constitute supports or rests therefor. It will furthermore be noted that with the parts in the position shown in Figure 8, the link 11 is entirely received within the walls of the channel and has straight portions at each end engaging portions 21 and 22 of the side bar. It will thus be apparent that this arrangement provides a very rigid and strong connection between a pillar and its respective side bar. It will be apparent that each side bar is connected to its respective pillar in the manner above described and that a plate 17 is provided for each pillar, these plates being positioned in the manner disclosed in Figure 2.

For effecting a strong connection between each side bar and its pillar and assisting in the collapsing of the framework there is provided an arm 23 pivotally secured at one end to its respective pillar below the plate 17 and having its other end pivotally secured to a projection 24 integral with the inner wall of the side bar and adjacent the end thereof. Each side bar is provided with a front end wall 25 having a flange 26 projecting forwardly and inwardly therefrom and adapted to engage a top end portion of the header 10. Suitable fastening means 26' are utilized to rigidly secure the header to the front end of each side bar, this connection being further insured by means of a bolt 27 passing transversely through the header and threadedly engaging an opening in the wall 25.

As shown in Figure 1 the header 10 is adapted to rest upon a stationary header 28, this latter header being provided with a groove within which is suitably secured a strip of resilient material 29 such as rubber for effecting a seal between the headers.

Preferably the outer wall of each side bar is provided with spaced inwardly projecting bosses 29 which are provided with recesses in their outer faces for receiving suitable sockets 30. The fabric 8 is permanently secured at its edges to the body 1, pillars 4 and the header 10 but the edges of the fabric adjacent the side bars are provided with studs 31 spaced to register with and engage the sockets 30 whereby these edge portions of the fabric may be detachably secured to the side bars.

If it is desired to collapse the framework to open car position, the studs 31 are detached from the sockets 30 and the bow 32 is broken. The side bars are next broken away from the pillars with the arms 23 and the links 11 suitably guiding the ends of the side bars with respect to the pillars so that the bars will lie substantially parallel to and upon the top of the pillars in the completely collapsed position of the framework as clearly shown in dotted lines in Figure 1. Any suitable means (not shown) may be used for tying the framework in collapsed position and a suitable covering (also not shown) may be provided for enclosing the same. When it is desired to return the framework to the closed car position this can be easily accomplished by reversing the aforesaid operations whereby the side bars will again assume positions perpendicular to the pillars with the end portions 19 abutting the shoulders 18 and with the link received in the top of the channel portions.

From the foregoing it will be apparent that I have provided a novel construction wherein the upper body portion and top of a motor vehicle may be easily and quickly moved from collapsed to uncollapsed position and vice versa, the arrangement being such that with the parts in the uncollapsed position, the same will present a strong sturdy and rigid construction possessing all the advantages of a permanent body and top construction.

What I claim as my invention is:

In a device of the character described, a pillar provided with a pair of spaced shoulders and a hinge section positioned between said shoulders, a side bar channel shape in cross section having an end wall closing the channel and adapted to abut against said shoulders, said end wall having recessed portions adapted to register with the openings between the hinge section and shoulders of said pillars, and a link hinged to said side bar intermediate the ends of the bar and provided with a hinge section associated with the hinge section of said pillar, said link being adapted in one position of adjustment to lie within the channel of said side bar with its hinge section engaging the recessed portions of the end of said bar.

In testimony whereof I affix my signature.

HERMAN C. MAISE.